US012255010B2

(12) United States Patent
Dariusz et al.

(10) Patent No.: US 12,255,010 B2
(45) Date of Patent: Mar. 18, 2025

(54) SOUNDPROOFING TRANSFORMER

(71) Applicant: Hyundai Electric & Energy Systems Co., Ltd., Seoul (KR)

(72) Inventors: Nowak Dariusz, Zurich (CH); Bosnjak Bruno, Zurich (CH); Holaus Walter, Zurich (CH); Walker Jonas, Zurich (CH)

(73) Assignee: Hyundai Electric & Energy Systems Co., Ltd., Seoul (KR)

(*) Notice: Subject to any disclaimer, the term of this patent is extended or adjusted under 35 U.S.C. 154(b) by 628 days.

(21) Appl. No.: 17/617,235

(22) PCT Filed: May 19, 2020

(86) PCT No.: PCT/KR2020/006525
§ 371 (c)(1),
(2) Date: Dec. 7, 2021

(87) PCT Pub. No.: WO2020/251178
PCT Pub. Date: Dec. 17, 2020

(65) Prior Publication Data

US 2022/0238273 A1 Jul. 28, 2022

(30) Foreign Application Priority Data

Jun. 13, 2019 (KR) ........................ 10-2019-0069998

(51) Int. Cl.
*H01F 27/33* (2006.01)
*H01F 27/02* (2006.01)
*H01F 27/12* (2006.01)

(52) U.S. Cl.
CPC ............. *H01F 27/33* (2013.01); *H01F 27/02* (2013.01); *H01F 27/025* (2013.01); *H01F 27/125* (2013.01)

(58) Field of Classification Search
CPC ........ H01F 27/33; H01F 27/02; H01F 27/025; H01F 27/125; H01F 27/08; H01F 27/085;
(Continued)

(56) References Cited

U.S. PATENT DOCUMENTS

2011/0147115 A1 6/2011 Ertl
2013/0043965 A1* 2/2013 Devaux .................. H01F 27/33 336/94
2018/0047500 A1* 2/2018 Holzer .................... H01F 27/33

FOREIGN PATENT DOCUMENTS

JP 2002073034 A * 3/2002
JP 2010-212350 A 9/2010
(Continued)

OTHER PUBLICATIONS

Search Report issued Oct. 31, 2022 in European Patent Application No. 20822823.9.

*Primary Examiner* — Tszfung J Chan
(74) *Attorney, Agent, or Firm* — Fox Rothschild LLP

(57) ABSTRACT

A soundproofing transformer includes a tank; a winding portion and a core portion provided inside the tank; an insulating fluid provided inside the tank; a reinforcing member provided outside of the tank; a cavity having a resonance space and connected to the reinforcing member by a coupling member; a partition member stacked on the cavity, and having an acoustic absorption portion; a noise inlet member having a first inlet facing the tank, connected to the resonance, and configured to transmit noise introduced from the first inlet to the resonance space; and a noise reduction panel connected to at least one of the partition member and the noise inlet member, and having a second inlet provided to communicate with the acoustic absorption portion while facing the tank.

22 Claims, 14 Drawing Sheets

200

(58) Field of Classification Search
CPC ........ H01F 27/10; H01F 27/105; H01F 27/12; H01F 27/14; H01F 27/16; H01F 27/18; H01F 27/20; H01F 27/22
USPC ...................... 336/55, 57, 58, 61, 90, 92, 94
See application file for complete search history.

(56) References Cited

FOREIGN PATENT DOCUMENTS

| | | | | |
|---|---|---|---|---|
| JP | 2012-123293 | A | | 6/2012 |
| JP | 2013021035 | A | * | 1/2013 |
| JP | 2013200426 | A | * | 10/2013 |
| JP | 2015-069977 | A | | 4/2015 |
| KR | 2009-0033304 | A | | 4/2009 |
| KR | 2011-0055669 | A | | 5/2011 |
| KR | 2016-0026099 | A | | 3/2016 |
| KR | 2016026099 | A | * | 3/2016 |
| KR | 101720912 | B1 | | 3/2017 |
| KR | 101746129 | B1 | | 6/2017 |
| KR | 2017-0089062 | A | | 8/2017 |

* cited by examiner

SOUNDPROOFING TRANSFORMER

CROSS-REFERENCE TO RELATED APPLICATIONS

This application is a National Phase application filed under 35 USC 371 of PCT International Application No. PCT/KR2020/006525 with an International Filing Date of May 19, 2020, which claims priority from Korean Application 10-2019-0069998 filed on Jun. 13, 2019. The entire contents of these applications are incorporated herein by reference in their entirety.

TECHNICAL FIELD

The present disclosure relates to a soundproofing transformer.

BACKGROUND ART

As illustrated in FIG. 1, an internal space 11*a* is provided inside a tank 11 forming an outer appearance of a conventional transformer 10, and the internal space 11*a* is provided with a core 12 and a winding 13, wound around the core. The internal space 11*a* may be filled with oil, an insulating fluid.

Vibrations of the core 12 and the winding 13 may occur inside the tank 11 of the transformer 10, and the vibrations may be transmitted to the tank 11 of the transformer through a mechanical structure of the transformer and the insulating fluid.

In such a process, acoustic sound may be generated, and the generated acoustic sound may be transmitted to a periphery of the transformer 10 as noise.

Therefore, there is a need for research on noise reduction, optimized for various designs, standards, and mechanical specifications of the transformer.

PRIOR ART DOCUMENT

KR 10-1746129 B1 (2017 Jun. 5)

DISCLOSURE

Technical Problem

An aspect of the present disclosure is to reduce noise of a transformer.

In addition, an aspect of the present disclosure is to reduce noise in a manner optimized for characteristics of a transformer.

Technical Solution

According to an aspect of the present disclosure, a soundproofing transformer may include: a tank; a winding portion and a core portion provided inside the tank; an insulating fluid provided inside the tank; a reinforcing member provided outside of the tank; a cavity having a resonance space and connected to the reinforcing member by a coupling member; a partition member stacked on the cavity and having an acoustic absorption portion; a noise inlet member having a first inlet facing the tank, connected to the resonance space, and configured to transmit noise introduced from the first inlet to the resonance space; and a noise reduction panel connected to at least one of the partition member and the noise inlet member, and having a second inlet provided to communicate with the acoustic absorption portion while facing the tank.

According to another aspect of the present disclosure, a soundproofing transformer may include: a tank; a winding portion and a core portion provided inside the tank; an insulating fluid provided inside the tank; a reinforcing member provided outside of the tank; a cavity having a resonance space and disposed to face the tank and the reinforcing member; a partition member stacked on the cavity and having an acoustic absorption portion; a noise inlet member having a first inlet facing the tank, connected to the resonance space, and configured to transmit noise introduced from the first inlet to the resonance space; and a noise reduction panel connected to at least one of the partition member and the noise inlet member, and having a second inlet provided to communicate with the acoustic absorption portion while facing the tank.

In addition, the cavity may include a noise inlet hole formed on a surface facing the second inlet to communicate with the resonance space.

In addition, the noise reduction panel may include the plurality of second inlets. The noise inlet hole may be a hole penetrating the cavity, the plurality of noise inlet holes being provided in the cavity.

In addition, the partition member may connect the cavity and the noise reduction panel, and may be provided to separate the noise reduction panel from the cavity.

In addition, the partition member may be disposed outside an outer peripheral surface of the second inlet, the noise inlet hole and the noise inlet member to form the acoustic absorption portion on the outer peripheral surface of the noise inlet member.

The acoustic absorption portion may be provided with a porous acoustic absorption material.

In addition, the plurality of noise inlet members may be provided, and may be provided to be spaced apart from each other by a predetermined distance.

In addition, the resonance space of the cavity may have a cylindrical form, a volume ($V_o$) of the resonance space of the cavity, a length ($L_{eq}$) of the noise inlet member, and a cross-sectional area (A) of the inner diameter of the noise inlet member may be determined by a resonance frequency ($f_H$), the resonance frequency ($f_H$) may be determined by $$f_H = \frac{v}{2\pi}\sqrt{\frac{A}{V_o L_{eq}}}, \text{ and } v = \sqrt{\gamma\frac{P_o}{\rho}},$$

γ may be an adiabatic index, $P_o$ may be pressure in the resonance space of the cavity, and ρ may be a mass density of a fluid present in the resonance space of the cavity.

In addition, the cavity may include a first cavity having a first resonance space, and to which the noise inlet member is connected; and a second cavity having a second resonance space, separated from the first resonance space and to which the noise inlet member is connected, the second cavity being stacked on the first cavity. The noise inlet member connected to the first cavity may be connected to the noise reduction panel through the second resonance space and the acoustic absorption portion.

In addition, the cavity may include a first cavity having a first resonance space, and to which the noise inlet member is connected; and a second cavity having a second resonance space separated from the first resonance space, and accommodated in the first resonance space. The noise inlet member connected to the second cavity may be connected to the noise reduction panel through the acoustic absorption portion.

In addition, the cavity may include a first cavity having a first resonance space, and to which a first noise inlet member communicating with the first resonance space is connected; and a second cavity having a second resonance space separated or not separated from the first resonance space, and to which a second noise member communicating with the second resonance space is connected.

In addition, the first cavity and the second cavity may include a connection hole on a surface facing each other, respectively, and a cover member provided to be coupled or uncoupled to the connection hole to open or close the connection hole may further be included.

In addition, a fastening frame connected to the cavity and having at least one fastening hole may further be included.

Advantageous Effects

According to the present disclosure, it is possible to reduce noise of a transformer.

In addition, noise may be reduced in a manner optimized for characteristics of the transformer.

BEST MODE FOR INVENTION

Figure 1:
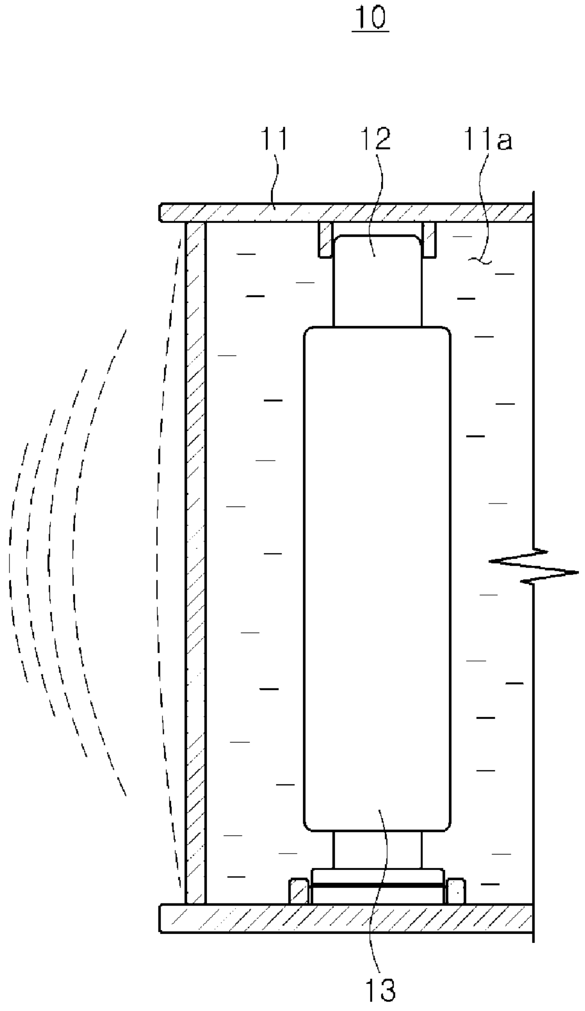
FIG. 1 is a schematic view illustrating a conventional transformer.

In order to facilitate understanding of the description of the embodiments of the present disclosure, elements denoted by the same reference numerals in the accompanying drawings are the same element, and among the constituent elements which perform the same function, the related constituent elements are indicated by the number on the same or an extension line.

In order to clarify the gist of the present disclosure, descriptions of elements and techniques well known in the related art will be omitted, and the present disclosure will be described in detail with reference to the accompanying drawings.

It is to be understood that the present disclosure may, however, be exemplified in many different forms and should not be construed as being limited to specific embodiments set forth herein, but may be suggested by those skilled in the art in other forms in which certain elements are added, alternated, and deleted.

Figure 2:
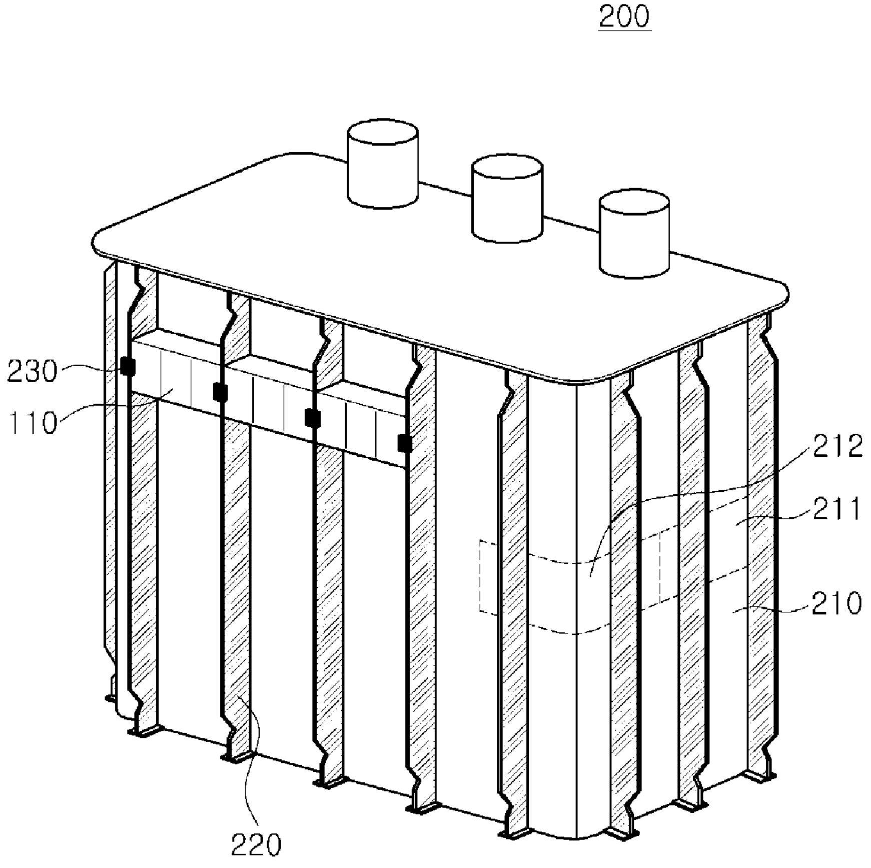
FIG. 2 is a schematic perspective view illustrating a soundproofing transformer according to an embodiment of the present disclosure.

In FIG. 2, a soundproofing transformer 200 is illustrated in an embodiment of the present disclosure.

The soundproofing transformer 200 according to an embodiment of the present disclosure may include a tank 210, a winding portion 211 and a core portion 212 provided inside the tank, an insulating fluid provided inside the tank, a reinforcing member 220 provided outside of the tank, a cavity 110 having a resonance space 111 and connected to the reinforcing member 220 by a coupling member 230, a partition member 140 stacked on the cavity 110 and having an acoustic absorption portion 141, a noise inlet member 120 having a first inlet 132 facing the tank 210 and connected to the resonance space 111 to transmit noise introduced from the first inlet 132 to the resonance space 111, and a noise reduction panel 130 connected to at least one of the partition member 140 and the noise inlet member 120 and having a second inlet 131 provided to communicate with the acoustic absorption portion 141 while facing the tank 210.

Figure 3:
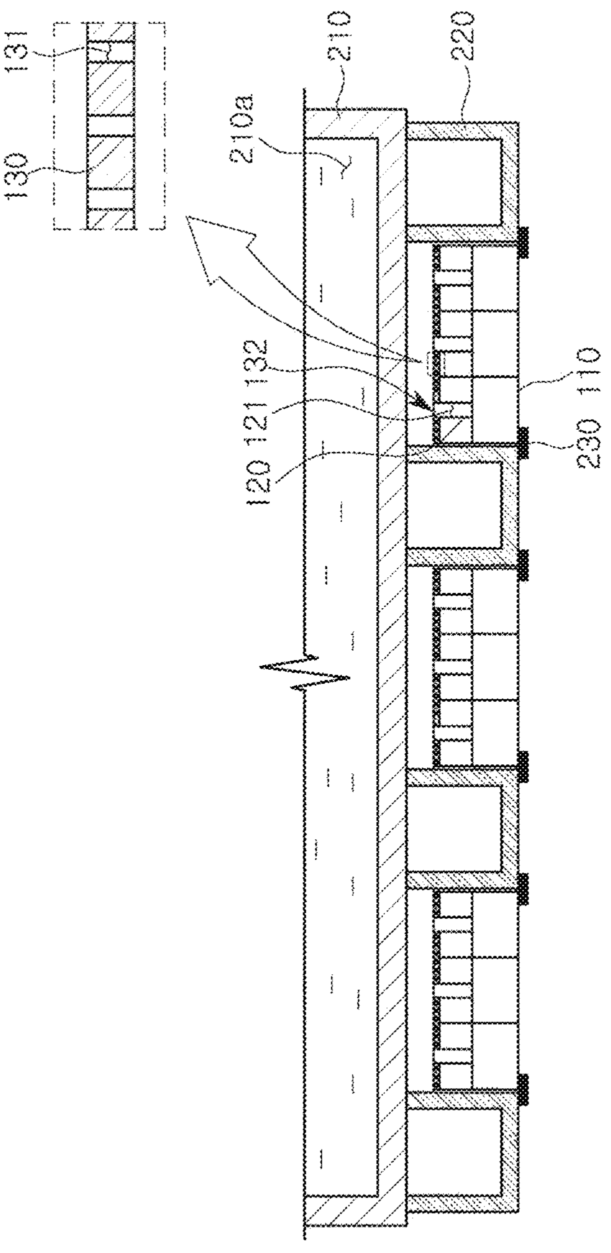
FIG. 3 is schematic view illustrating a partial cross-section in a direction perpendicular to a gravity direction of FIG. 2.
Figure 4:
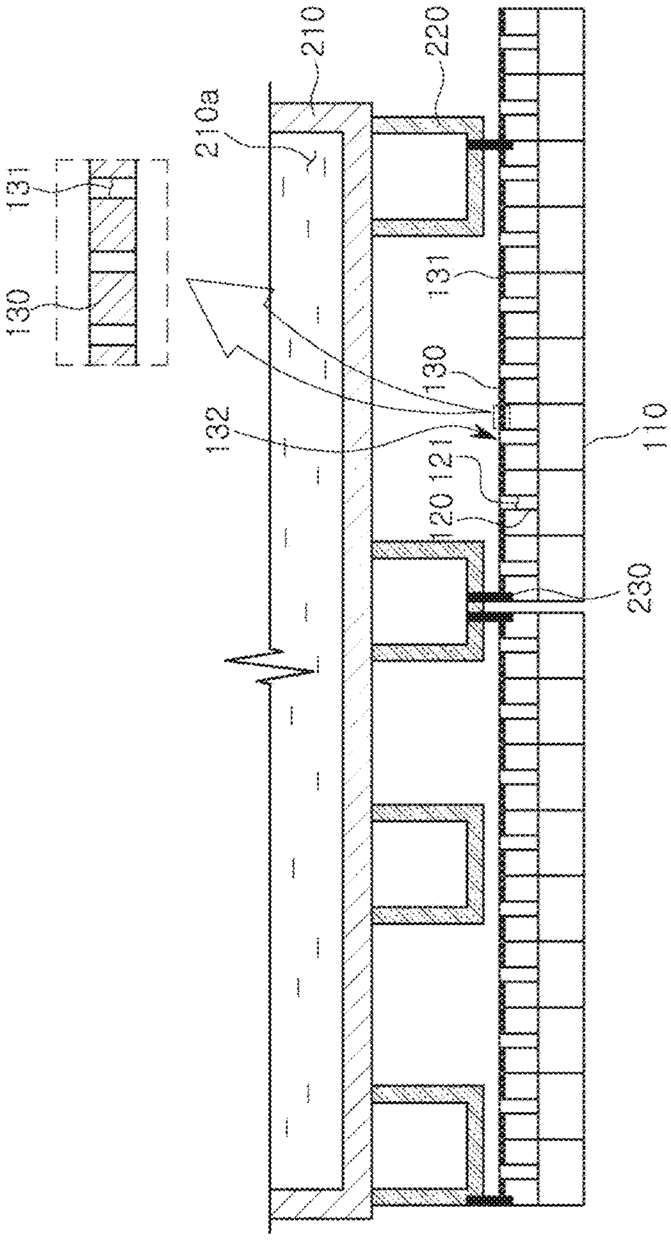
FIG. 4 is a schematic view illustrating a partial cross-section of a soundproofing transformer according to another embodiment of the present disclosure.
Figure 5:
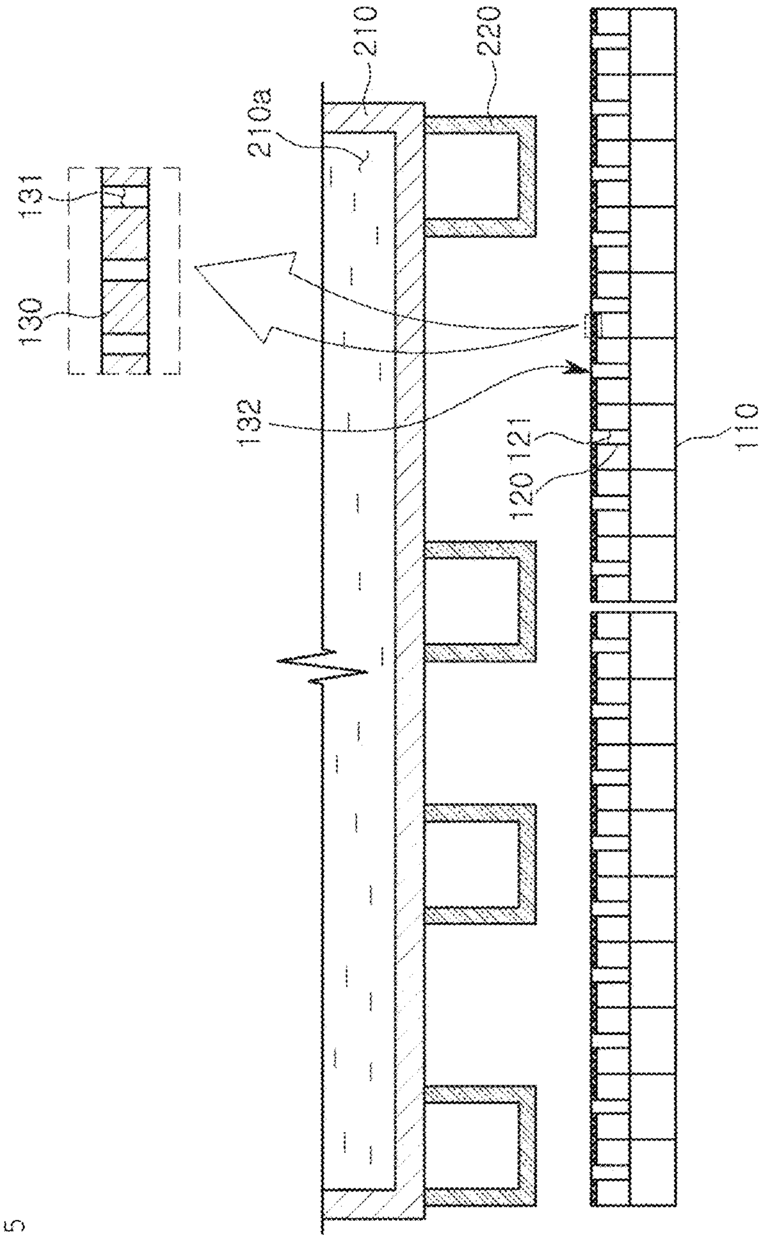
FIG. 5 is a schematic view illustrating a partial cross-section of a soundproofing transformer according to another embodiment of the present disclosure.
Figure 6:
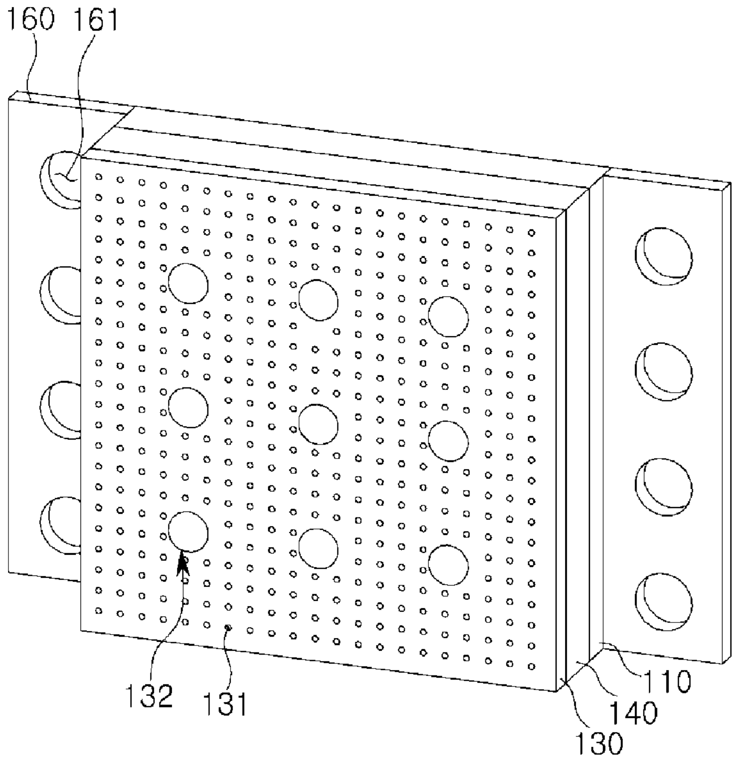
FIG. 6 is a schematic perspective view illustrating a cavity, a partition member, a noise inlet member, a noise reduction panel, and a fastening frame according to an embodiment of the present disclosure.

In the soundproofing transformer according to an embodiment of the present disclosure, as illustrated in FIGS. 3 to 5, the noise reduction panel 130 may be coupled to the reinforcing member 220 so as to face the tank 210 or the noise reduction panel 130 may be spaced apart from the reinforcing member 220 by a predetermined distance so as to face the reinforcing member 220 and the tank 210. The tank 210 of transformer may have a space 210*a* for accommodating an insulating fluid.

In the soundproofing transformer according to an embodiment of the present disclosure, as illustrated in FIG. 3, the cavity 110 may be coupled to the reinforcing member 220 by using the coupling member 230 such that the cavity 110 is interposed between the reinforcing members 220.

In a soundproofing transformer according to another embodiment of the present disclosure, as illustrated in FIG. 4, the noise reduction panel 130 may be coupled to the reinforcing member 220 by using the coupling member 230, such that the cavity 110 covers the reinforcing member 220.

Meanwhile, as illustrated in FIG. 5, the cavity 110 may be placed to be spaced apart from the tank 210 and the reinforcing member 220 by a predetermined distance, and these various installation methods may be suitably selected and applied depending on characteristics of the transformer, service environments of the transformer, and the like.

A configuration for reducing noise in the present disclosure, as illustrated in FIGS. 6 to 9, may include a cavity 110 having a resonance space 111 having a constant volume, a noise inlet member 120 connected to the cavity 110 to communicate with the resonance space 111, and a noise reduction panel 130 connected to at least one of the cavity 110 and the noise inlet member 120 and having at least one second inlet 131 facing the tank (210 of FIG. 2).

Figure 7:
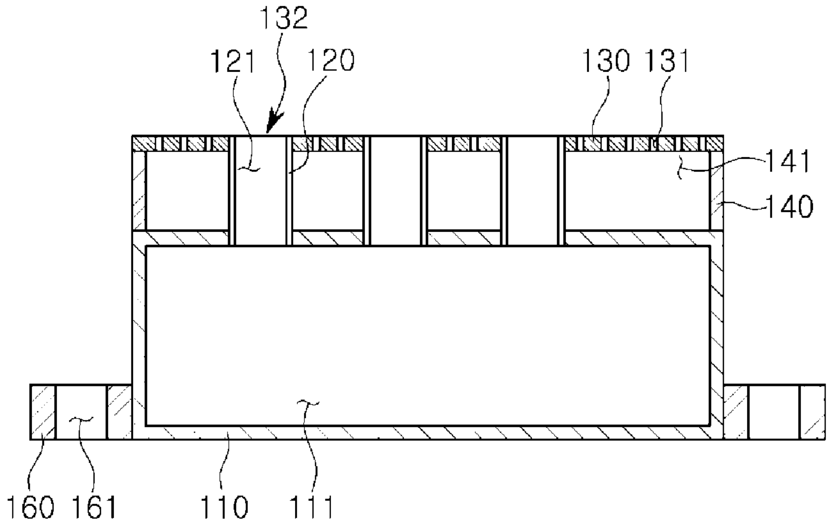
FIG. 7 is a cross-sectional view of FIG. 6.

When describing an embodiment of the present disclosure with reference to FIG. 7 in more detail, the noise inlet member 120 may include a hollow portion 121 therein, and both end portions of the noise inlet member 120 may be opened.

In this case, a side, in which the noise inlet member 120 faces the tank (210 of FIG. 2) of the transformer, is a first inlet 132 through which noise is introduced.

The hollow portion 121 may be continuous with the first inlet 132, and may be continuously provided in a longitudinal direction of the noise inlet member 120. A diameter of the hollow portion 121 may be constant in the longitudinal direction of the noise inlet member 120.

A region of the noise inlet member 120 in which the first inlet 132 is present may be connected to the noise reduction panel 130, and the other side of the noise inlet member 120 may be connected to the cavity 110.

In connecting the noise inlet member 120 and the cavity 110, the noise inlet member 120 is connected to the cavity 110 such that the hollow portion 121 of the noise inlet member 120 is connected to the resonance space 111.

The hollow portion 121 of the noise inlet member 120 may be connected to the resonance space 111 and may simultaneously also be provided to communicate with an outside of the cavity 110 and an outside of the noise reduction panel 130.

Therefore, the noise inlet member 120 may be a path through which noise is introduced to the resonance space 111 of the cavity 110.

The resonance space 111 of the cavity 110 may be filled with air, and the air present in the resonance space 111 may act as a spring to cause resonance at a specific frequency. Therefore, noise introduced into the resonance space 111 may be reduced.

Specifically, when resonance of the air present in the resonance space 111 of the cavity 110 occurs, a fluid (for example, air) may actively flow in and out through the first inlet 132 and the hollow portion 121 of the noise inlet member 120, and in this case, the fluid may rub against a tube wall of the noise inlet member 120 to generate thermal energy, thereby allowing acoustic absorption.

Meanwhile, the second inlet 131 may be a hole penetrating the noise reduction panel 130 in a direction parallel to the hollow portion 121.

The plurality of the second inlets 131 may be provided on the noise reduction panel 130, and an inner diameter of the second inlet 131 may be measured in micrometer units.

In addition, since the noise blocking performance, that is, the frequency at which resonance is possible, may be adjusted by altering an inner diameter of the second inlet 131, the size of inner diameter of the second inlet 131 may be appropriately selected depending on operators and work environments and applied, but is not necessarily limited to that of the present disclosure.

The second inlet 131 may cause thermal losses and viscous losses of sound waves generated by noise with a wall surface of the noise reduction panel 130, thereby weakening noise.

The thermal losses and the viscous losses of the sound waves may occur in thermal and viscous boundary layers near the wall surface of the noise reduction panel 130.

Therefore, as the number of the second inlet 131 increases and the diameter of the second inlet 131 decreases, an acoustic absorption effect may increase.

Figure 8:
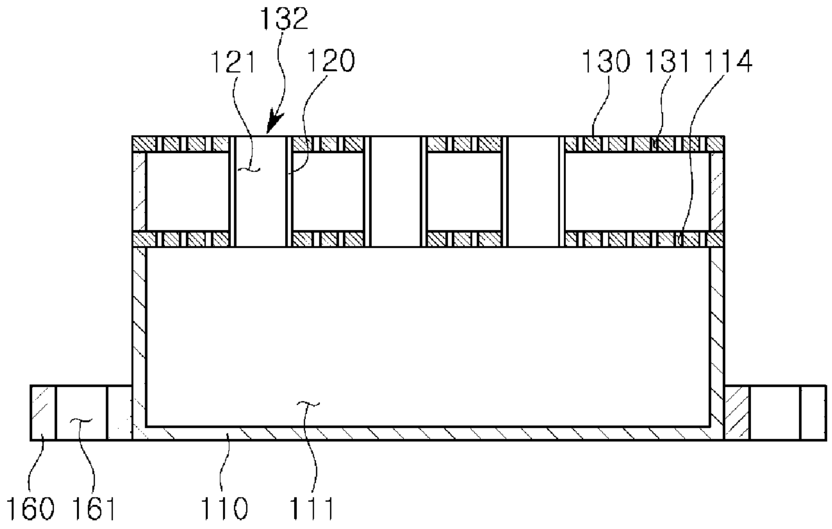
FIG. 8 is a schematic cross-sectional view illustrating a cavity, a partition member, a noise inlet member, a noise reduction panel, and a fastening frame according to another embodiment of the present disclosure.

Therefore, in another embodiment of the present disclosure, as illustrated in FIG. 8, a noise inlet hole 114 having a diameter in a micrometer unit may be formed on one surface of the cavity 110 facing the noise reduction panel 130, thereby further increasing the acoustic absorption effect as described above.

In an embodiment of the present disclosure, the noise inlet hole 114 may be a hole penetrating the cavity 110 in a direction parallel to the hollow portion 121 of the noise inlet member 120.

In this case, the noise inlet hole 114 may be a hole penetrating one surface of the cavity 110 to be connected to the resonance space 111 inside the cavity.

Further, the noise inlet hole 114 may be provided in a slot shape other than holes.

Meanwhile, the partition member 140 according to the present disclosure may serve to connect the cavity 110 and the noise reduction panel 130, and to separate the noise reduction panel 130 from the cavity 110.

The partition member 140 may be disposed outside of the outer peripheral surface of the noise inlet member 120, the first inlet 132, the second inlet 131, and the noise inlet hole 114 to form the acoustic absorption portion 141 on the outer peripheral surface of the noise inlet member 120.

Accordingly, the partition member 140 may be provided to surround the noise inlet member 120.

The fluid present in the acoustic absorption portion 141 may also act as a spring to contribute to increasing the acoustic absorption effect on the same principle as described above.

Figure 9:
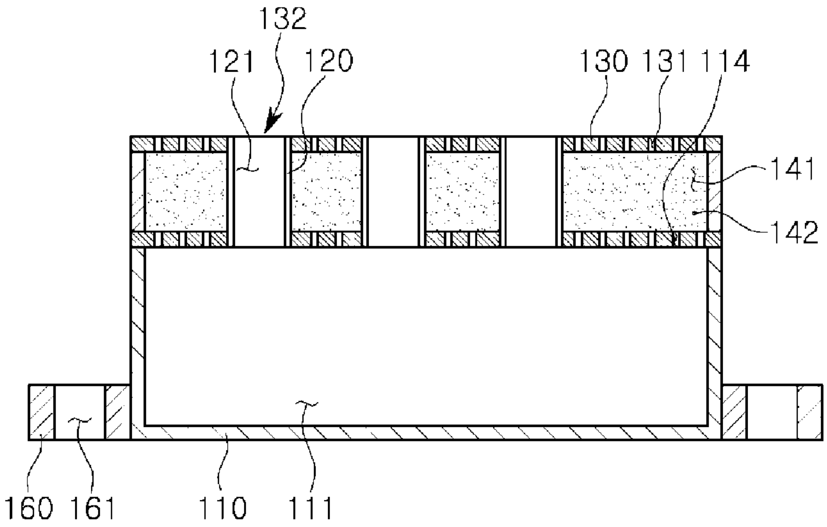
FIG. 9 is a schematic cross-sectional view illustrating a cavity, a partition member, a noise inlet member, a noise reduction panel, and a fastening frame according to another embodiment of the present disclosure.

Further, as illustrated in FIG. 9, when the acoustic absorption portion 141 is provided with a porous acoustic absorption material 142, the acoustic absorption effect may be further increased and the noise may be significantly reduced.

A material of the porous acoustic absorption material 142 may be glass fiber, open-cell foam, felted or cast porous ceiling tile, or the like, however, the material is not necessarily limited to the present disclosure.

Meanwhile, the plurality of noise inlet members 120 may be provided in the cavity 110, and the outer peripheries of the noise inlet members 120 may be spaced apart from each other by a predetermined distance.

The number of the noise inlet member 120 and the distance in which the noise inlet members 120 are spaced apart may be suitably set based on a frequency at which the resonance space 111 of the cavity 110 resonates. In this case, the frequency at which the resonance space 111 resonates may be generated by noise.

Figure 10:
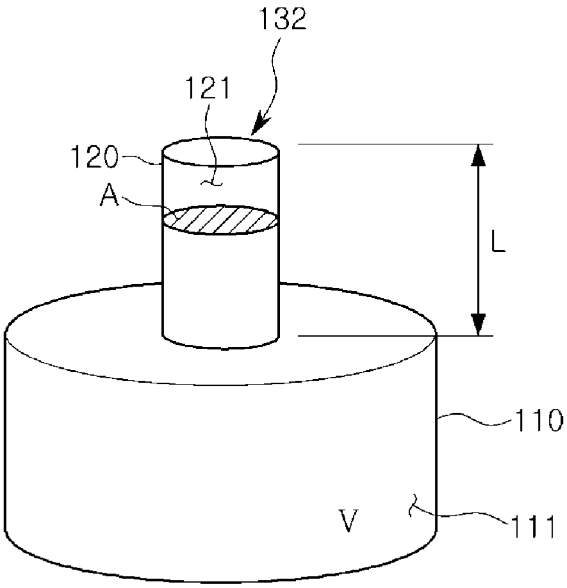
FIG. 10 is a schematic view illustrating a cavity and a noise inlet member according to an embodiment of the present disclosure.

As illustrated in FIG. 10, in another embodiment of the present disclosure, the cavity may have a cylindrical form, such that the resonance space 111 of the cavity 110 may also have a cylindrical form.

In this case, the volume (V) of the resonance space of the cavity, the length (L) of the noise inlet member 120, and the cross-sectional area (A) of the inner diameter of the noise inlet member 120 may be determined by a resonance frequency ($f_H$) of the fluid present in the resonance space 111.

A relationship between the resonance frequency ($f_H$, hz) and the volume (V) of the resonance space, the length (L) of the noise inlet member 120, and the cross-sectional area (A) of the inner diameter of the noise inlet member 120 is expressed by the following Equations 1 and 2.

The Equations 1 and 2 are relational expressions necessary for deriving the resonance frequency ($f_H$). The resonance frequency ($f_H$) may be generated by noise, and a numerical value thereof may also be determined by noise.

$$v = \sqrt{\gamma \frac{P_o}{\rho}} \quad \text{[Equation 1]}$$

$$f_H = \frac{v}{2\pi} \sqrt{\frac{A}{V_o L_{eq}}} \quad \text{[Equation 2]}$$

In the accompanied Equations 1 and 2, γ is an adiabatic index, $P_0$ is pressure of the resonance space (111 of FIG. 1), of the cavity, and ρ is a mass density of a fluid (for example, air) present in the resonance space (111 of FIG. 7) of the cavity.

Therefore, the specification of the volume (V) of the resonance space of the cavity, the length (L) of the noise inlet member 120, and the cross-sectional area (A) of the inner diameter of the noise inlet member 120 may be determined according to the rated frequency of the transformer, that is, the noise caused from the transformer.

A value of the rated frequency of the transformer may be substituted into a value of the resonance frequency ($f_H$) of the Equations expressed in Equations 1 and 2 to determine the volume (V) of the resonance space of the cavity, the length (L) of the noise inlet member 120, the cross-sectional area (A) of the inner diameter of the noise inlet member 120, that is, the cross-sectional area of the hollow portion 121.

The volume (V) of the resonance space 111 of the cavity 110 and the length (L) of the noise inlet member 120, illustrated in FIG. 10 are $V_o$ and $L_{eq}$ in Equation 2, respectively. When calculating by substituting the resonance frequency ($f_H$) into the Equation expressed Equation 2, A=A of FIG. 10, $L_{eq}$=L of FIG. 10, $V_o$=V of FIG. 10, and the rated frequency of transformer may be substituted into the resonance frequency ($f_H$) to be calculated.

That is, specifications of the cavity 110 and the noise inlet member 120 may be derived by using the Equations expressed in Equations 1 and 2 with a rated frequency value generated by the transformer.

Figure 11:
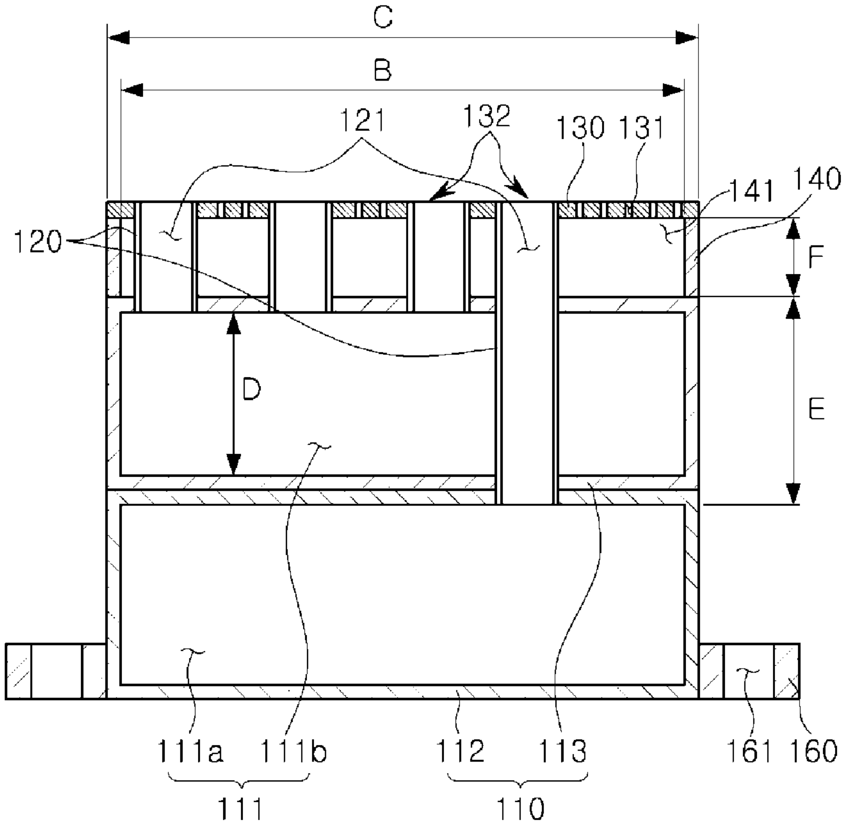
FIG. 11 is a schematic cross-sectional view illustrating a cavity, a partition member, a noise inlet member, a noise reduction panel, and a fastening frame according to another embodiment of the present disclosure.

For example, when the transformer having a rated frequency of 60 Hz is applied, volumes of first and second resonance spaces 111*a* and 111*b* of FIG. 11 may be calculated by the above formula expressed in Equations 1 and 2.

The specification relating to the noise inlet member 120 derived from the Equation 2 may be a specification relating to any one of three noise inlet members 120 connected to the second resonance space 111*b*, and the volume of the noise inlet member 120 penetrating the second resonance space 111*b* and the acoustic absorption portion 141 and connected to the first resonance space 111*a*, may be ignored when calculating the volume of the first resonance space 111*a* and the second resonance space 111*b*. Heights of the first and second resonance spaces 111*a* and 111*b* may be equal to each other.

In an embodiment of the present disclosure, dimensions in FIG. 11 may be as follows, B=410 mm, C=414 mm, D=76.5 mm, E=82.5 mm, and F=73.8 mm.

Figure 12:
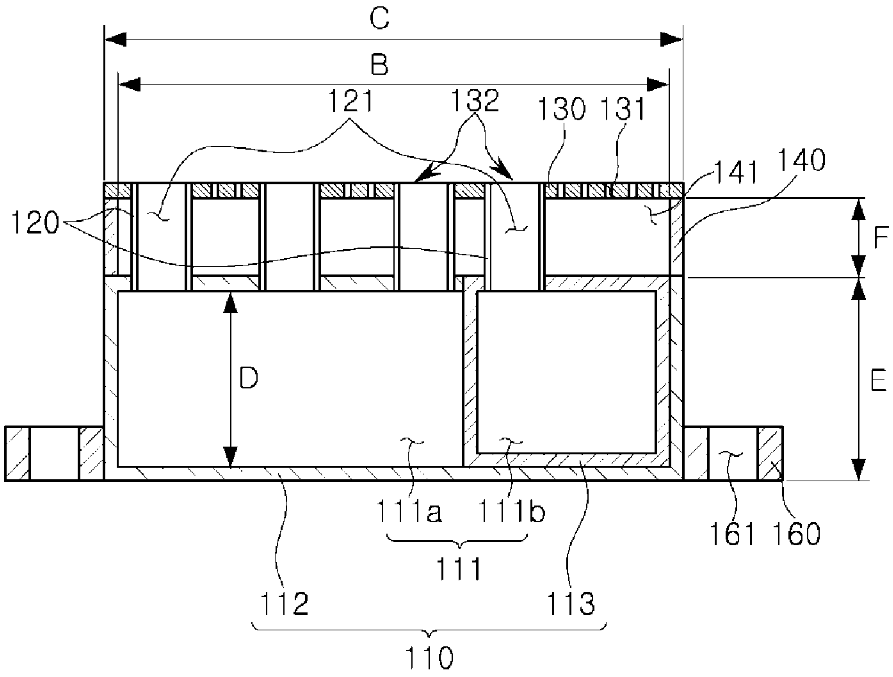
FIG. 12 is a schematic cross-sectional view illustrating a cavity, a partition member, a noise inlet member, a noise reduction panel, and a fastening frame according to another embodiment of the present disclosure.

In another embodiment of the present disclosure, when a transformer having a rated frequency of 50 Hz is applied, as illustrated in FIG. 12, the volume of the second resonance space 111*b* may be ignored when calculating the volume of the first resonance space 111*a*, and specifications of the noise inlet members 120 connected to the first resonance space 111*a* and the second resonance space 111*b* may be equal to each other.

However, the volume of the second resonance space 111*b* is not specified by the present disclosure. The volume of the second resonance space 111*b* may be suitably selected and applied by those skilled in the art in consideration of the rated frequency of the transformer and the service environment of the transformer.

For example, dimensions in FIG. 12 may be as follows, B=410 mm, C=414 mm, D=102.3 mm, E=108.3 mm, and F=73.8 mm.

However, these are only one example, and the detailed specifications may be determined by the transformer (or an environment generating noise).

Figure 13:
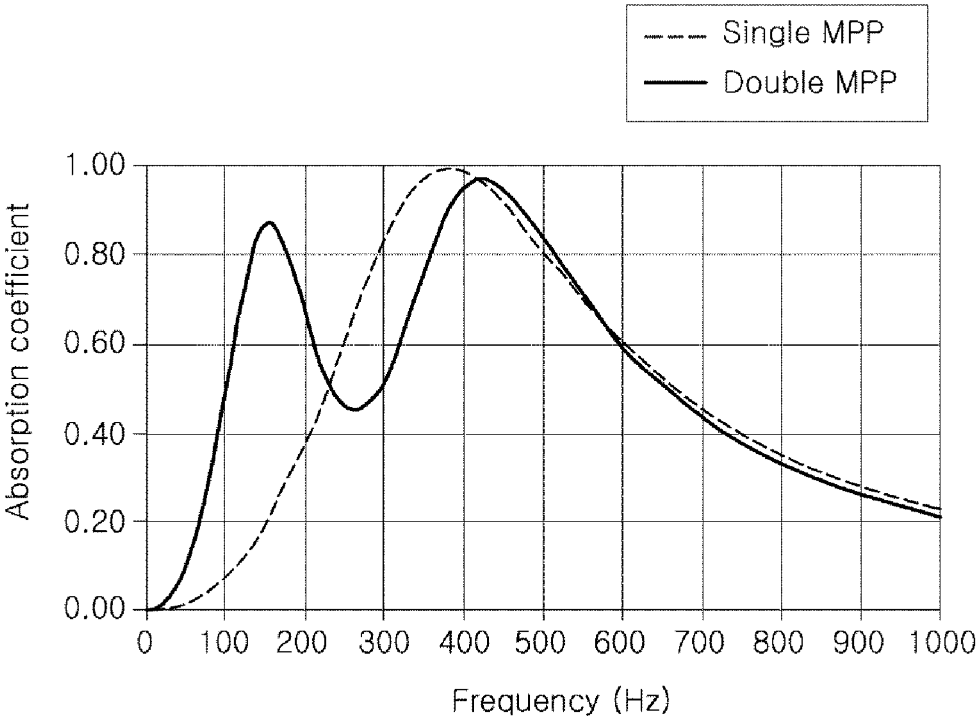
FIG. 13 is a view illustrating a sound wave absorption coefficient according to a frequency of the embodiments of the present disclosure.

Meanwhile, a sound wave absorption coefficient according to a frequency of a noise reduction apparatus according to FIGS. 7 and 8 is illustrated in FIG. 13.

Referring to FIG. 13, it can be confirmed that a noise reduction panel 130 having the second inlet 131 and the noise inlet hole 114 (double MPP) and a cavity 110 has a significantly increased sound wave absorption coefficient in a section of 110 Hz to 220 Hz, such that the noise blocking effect is further improved as compared with a noise reduction panel 130 having only the second inlet 131 (single MPP).

Meanwhile, as described above, the cavity 110 illustrated in FIG. 11 may include a first cavity 112 having a first resonance space 111*a* and to which the noise inlet member 120 is connected, and a second cavity 113 having a second resonance space 111*b* separated from the first resonance space 111*a*, stacked on an upper portion of the first cavity 112 and to which a plurality of noise inlet members 120 are connected.

In this case, the plurality of noise inlet members 120 connected to the second cavity 113 to communicate with the second resonance space 111*b* may be connected to the second cavity 113 through the acoustic absorption portion 141.

The noise inlet member 120 connected to the first resonance space 111*a* may be connected to the noise reduction panel 130 through the second resonance space 111*b* and the acoustic absorption portion 141.

Accordingly, noise may be reduced in various frequency areas while suppressing an increase in the width of the cavity 110, and utilization of space may be improved.

As another aspect, as illustrated in FIG. 12, the cavity 110 may include a first cavity 112 having a first resonance space 111*a* and to which the plurality of noise inlet members 120 are connected, and a second cavity 113 having a second resonance space 111*b* separated from the first resonance space 111*a* and accommodated in the first resonance space 111*a*.

In this case, the noise inlet member 120 connected to the second cavity 113 to communicate with the second resonance space 111*b* may be connected to the noise reduction panel 130 through the acoustic absorption portion 141.

By providing the cavity 110 in plural, utilization of space may be increased and noise may be reduced in various frequency areas.

Figure 14:
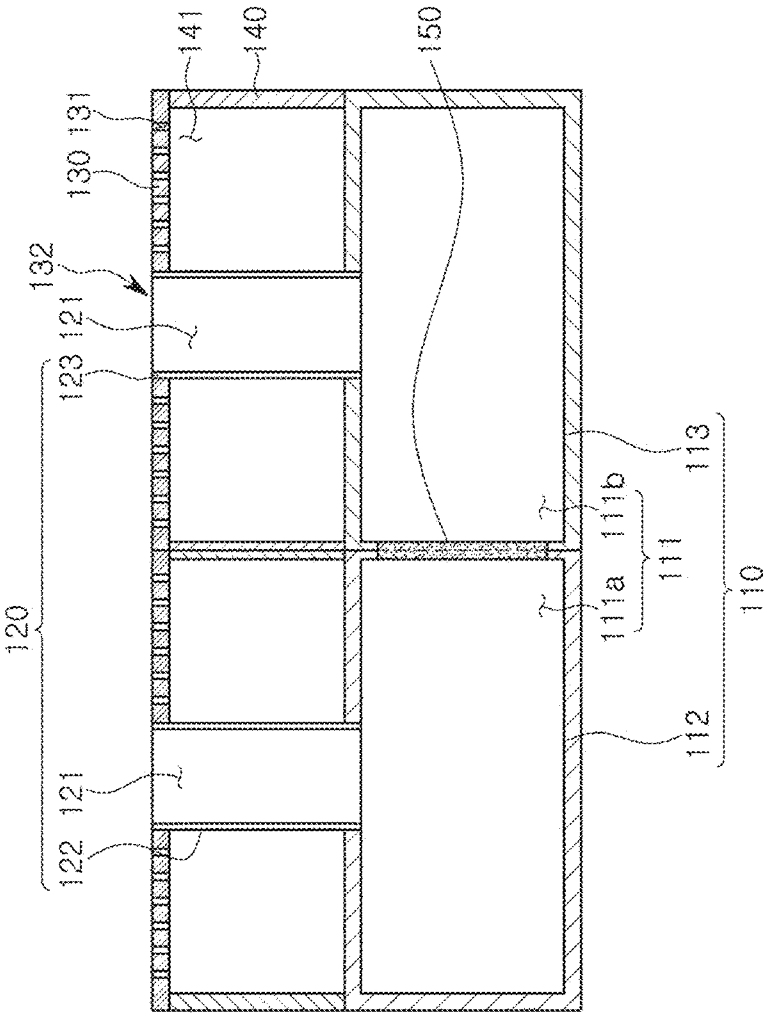
FIG. 14 is a schematic cross-sectional view illustrating a cavity, a partition member, a noise inlet member, and a noise reduction panel according to another embodiment of the present disclosure.
Figure 15:
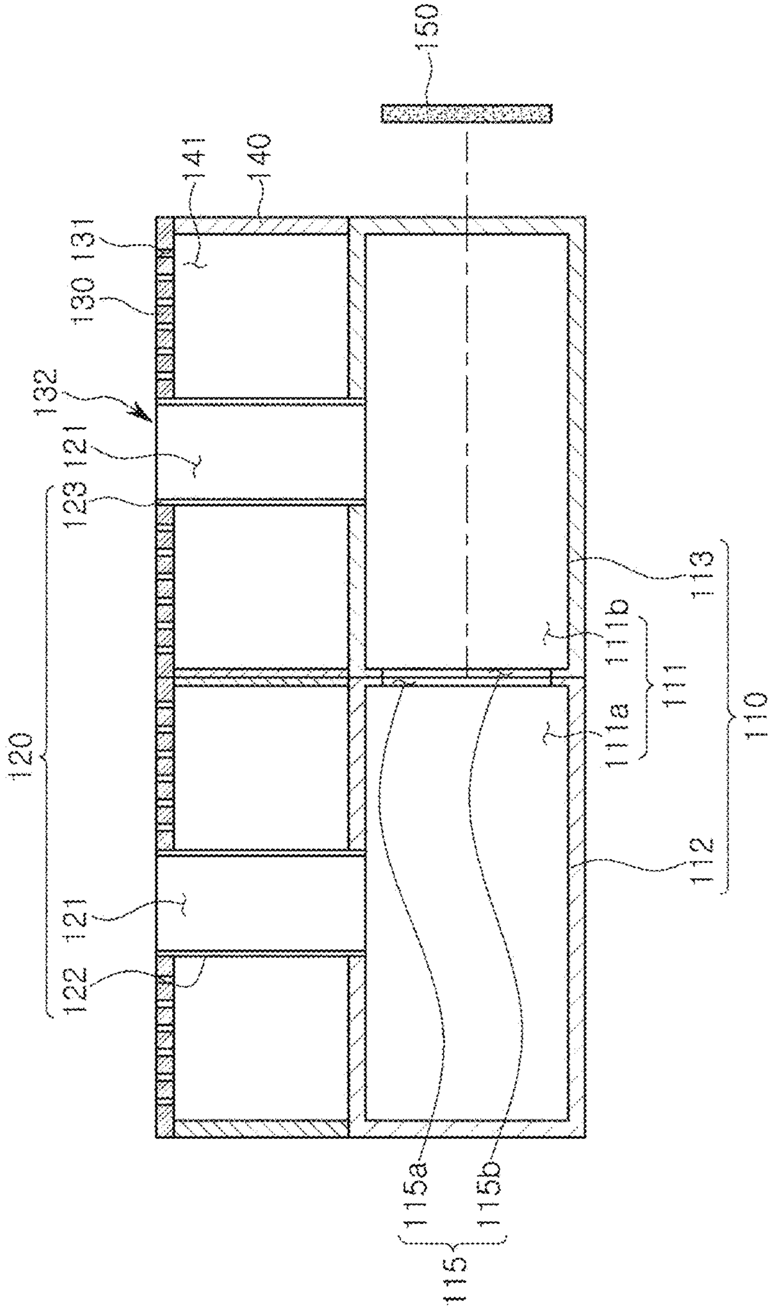
FIG. 15 is a schematic cross-sectional view illustrating a cavity, a partition member, a noise inlet member, and a noise reduction panel according to another embodiment of the present disclosure.
Figure 16:
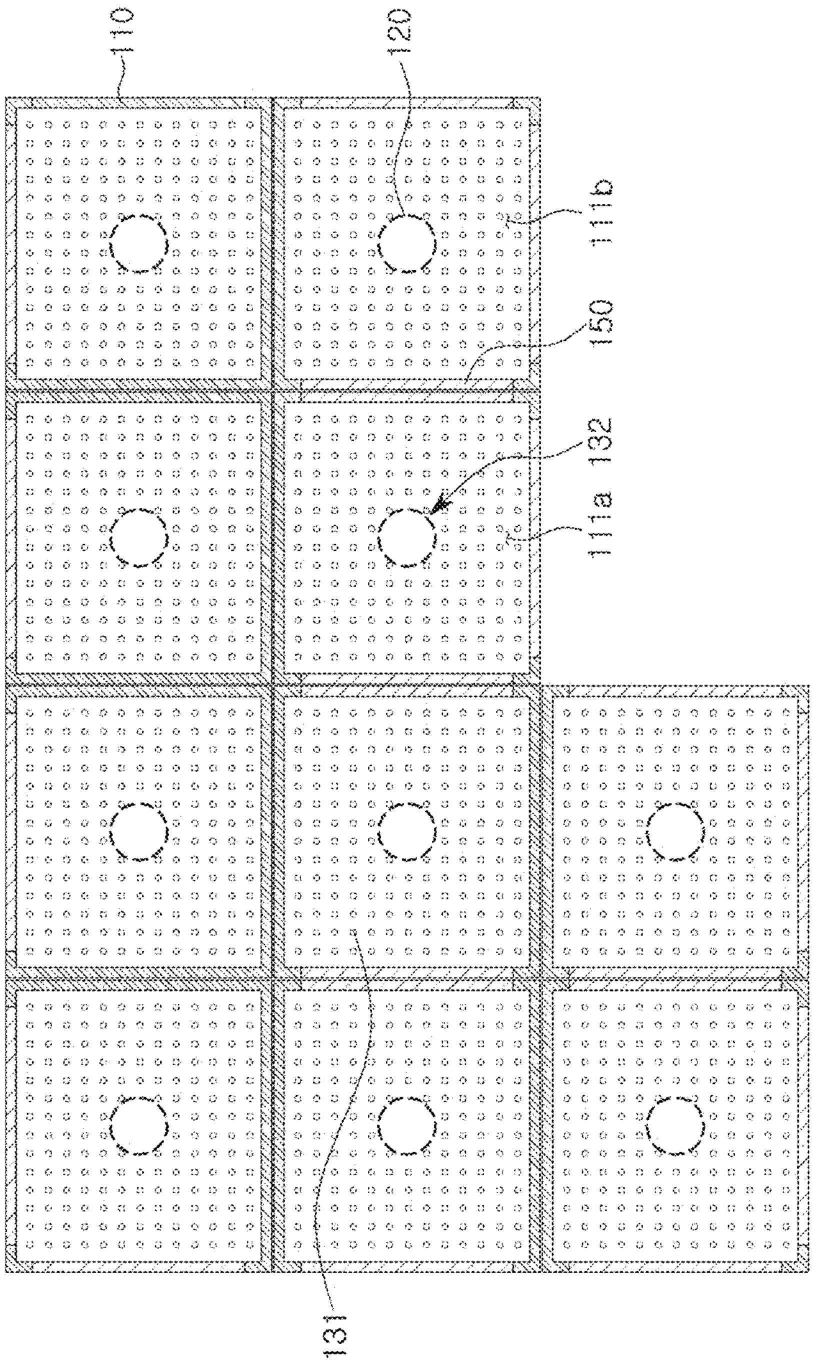
FIG. 16 is a plan view illustrating a cavity, a noise inlet member, and a noise reduction panel according to another embodiment of the present disclosure.

Further, as illustrated in FIGS. 14 to 16, a cavity 110 having a matrix structure may be provided.

This makes it possible to easily install the cavity 110 and the noise inlet member 120 having a resonance frequency equal to the rated frequency of the transformer, and the cavity 110 and the noise inlet member 120 may be modularized according to the specification of the transformer, thereby further improving convenience in use.

In an embodiment of the present disclosure, the cavity 110 may include a first cavity 112 and a second cavity 113 having resonance spaces 111.

More specifically, the cavity 110 may include a first cavity 112 having a first resonance space 111*a*, and a second cavity 113 having a second resonance space 111*b*.

A noise inlet member 120 may be connected to the first cavity 112 and the second cavity 113, respectively, and a hollow portion 121 of the noise inlet member 120 may be connected to the first resonance space 111*a* and the second resonance space 111*b*, respectively.

In this case, the first resonance space 111*a* of the first cavity 112 and the second resonance space 111*b* of the second cavity 113 may be separated or may not be separated from each other.

To this end, in an embodiment of the present disclosure, the first cavity 112 and the second cavity 113 may include a connection hole 115, respectively, as illustrated in FIG. 15. More specifically, the connection hole 115 may include a first connection hole 115*a* formed on a surface of the first cavity 112 facing the second cavity 113, and a second connection hole 115*b* formed on a surface of the second cavity 113 facing the first cavity 112.

A cover member 150 may be provided to be coupled to or be uncoupled from the connection hole 115 such that the first cavity 112 and the second cavity 113 may be connected to or separated from each other.

The cover member 150 may be provided to be coupled to the connection hole 115 by a bolt, or the like, and may be coupled to the connection hole 115 by a fitting tolerance with the connection hole 115.

According to the connection hole 115 and the cover member 150, the volume of the cavity 110 may be easily changed, and the convenience and speed of operation in the field may be improved.

In addition, a first noise inlet member 122 may be connected to the first cavity 112 to communicate with the first resonance space 111*a*, and a second noise inlet member 123 may be connected to the second cavity 113 to communicate with the second resonance space 111*b*.

The first and second cavities 112 and 113 and the noise reduction panel 130 are connected to each other even when the connection hole 115 is formed in the cavity 110, and a partition member 140 in which the noise reduction panel 130 is spaced apart from the first and second cavities 112 and 113 to form an acoustic absorption portion 141 between the noise reduction panel 130 and the first and second cavities 112 and 113 may be provided.

In this case, the acoustic absorption portion 141 may be provided with a porous sound absorption material (142 of FIG. 9) to further improve the noise reduction effect.

In addition, in an embodiment of the present disclosure, as illustrated in FIG. 16, the cavities 110 may be stacked in plural and modulated.

Accordingly, it is possible to easily adjust the specification of the cavity 110 according to the specification of the transformer.

While exemplary embodiments have been shown and described above, it will be apparent to those skilled in the art that modifications and variations could be made without departing from the scope of the present invention, as defined by the appended claims.

10, 200: transformer
110: cavity
111: resonance space
111*a*: first resonance space
111*b*: second resonance space
112: first cavity
113: second cavity
114: noise inlet hole
115: connection hole
115*a*: first connection hole
115*b*: second connection hole
120: noise inlet member
121: hollow portion
122: first noise inlet member
123: second noise inlet member
130: noise reduction panel
131: second inlet
140: partition member
141: acoustic absorption portion
142: porous acoustic absorption material
150: cover member
160: fastening frame
161: fastening hole
210: tank
211: winding portion
212: core portion
220: reinforcing member
230: coupling member

The invention claimed is:

1. A soundproofing transformer, comprising:
a tank;
a winding portion and a core portion provided inside the tank;
an insulating fluid provided inside the tank;
a reinforcing member provided outside of the tank;
a cavity having a resonance space and connected to the reinforcing member by a coupling member;
a partition member stacked on the cavity and having an acoustic absorption portion;
a noise inlet member having a first inlet facing the tank, connected to the resonance space, and configured to transmit noise introduced from the first inlet to the resonance space; and
a noise reduction panel connected to the partition member and the noise inlet member, and having a second inlet provided to communicate with the acoustic absorption portion while facing the tank,
wherein the cavity comprises a noise inlet hole formed in a surface facing the second inlet to communicate with the resonance space.

2. The soundproofing transformer of claim 1, wherein the noise reduction panel comprises a plurality of second inlets,
the noise inlet hole is a hole penetrating the cavity, and a plurality of noise inlet holes are provided in the cavity.

3. The soundproofing transformer of claim 2, wherein the partition member connects the cavity and the noise reduction panel, and is provided to separate the noise reduction panel from the cavity.

4. The soundproofing transformer of claim 3, wherein the partition member is disposed on outside of an outer peripheral surface of the second inlet, the noise inlet hole and the noise inlet member to form the acoustic absorption portion on an outer peripheral surface of the noise inlet member.

5. The soundproofing transformer of claim 4, wherein the acoustic absorption portion is provided with a porous acoustic absorption material.

6. The soundproofing transformer of claim 4, wherein a plurality of noise inlet members are provided, the noise inlet members being provided to be spaced apart from each other by a predetermined distance.

7. The soundproofing transformer of claim 1, wherein the resonance space of the cavity has a cylindrical form, a volume (Vo) of the resonance space of the cavity, a length ($L_{eq}$) of the noise inlet member, and a cross-sectional area (A) of the inner diameter of the noise inlet member are determined by a resonance frequency ($f_H$), the resonance frequency (fH) is determined by $$f_H = \frac{v}{2\pi}\sqrt{\frac{A}{V_o L_{eq}}}, \text{ and } v = \sqrt{\gamma\frac{P_o}{\rho}},$$

wherein γ is an adiabatic index, $P_o$ is pressure in the resonance space of the cavity, and ρ is a mass density of a fluid present in the resonance space of the cavity.

8. The soundproofing transformer of claim 6, wherein the cavity comprises:

a first cavity having a first resonance space, and to which the noise inlet member is connected; and a second cavity having a second resonance space, separated from the first resonance space and to which the noise inlet member is connected, and stacked on the first cavity, and the noise inlet member connected to the first cavity is connected to the noise reduction panel through the second resonance space and the acoustic absorption portion.

9. The soundproofing transformer of claim 6, wherein the cavity comprises:

a first cavity having a first resonance space, and to which the noise inlet member is connected; and a second cavity having a second resonance space separated from the first resonance space, the second cavity being accommodated in the first resonance space, and the noise inlet member connected to the second cavity is connected to the noise reduction panel through the acoustic absorption portion.

10. The soundproofing transformer of claim 1, wherein the cavity comprises:

a first cavity having a first resonance space, and to which a first noise inlet member communicating with the first resonance space is connected; and a second cavity having a second resonance space separated or not separated from the first resonance space, and to which a second noise inlet member communicating with the second resonance space is connected.

11. The soundproofing transformer of claim 10, wherein the first cavity and the second cavity have a connection hole on a surface facing to each other, respectively, and further comprise a cover member provided to be coupled or uncoupled to the connection hole to open or close the connection hole.

12. A soundproofing transformer, comprising:

a tank;

a winding portion and a core portion provided inside the tank;

an insulating fluid provided inside the tank;

a reinforcing member provided outside of the tank;

a cavity having a resonance space and disposed to face the tank and the reinforcing member;

a partition member stacked on the cavity and having a acoustic absorption portion;

a noise inlet member having a first inlet facing the tank, connected to the resonance space, and configured to transmit noise introduced from the first inlet to the resonance space; and a noise reduction panel connected to the partition member and the noise inlet member, and having a second inlet provided to communicate with the acoustic absorption portion while facing the tank, wherein the cavity comprises a noise inlet hole formed in a surface facing the second inlet to communicate with the resonance space.

13. The soundproofing transformer of claim 12, wherein the noise reduction panel has comprises a plurality of second inlets, the noise inlet hole is a hole penetrating the cavity, and a plurality of noise inlet holes are provided in the cavity.

14. The soundproofing transformer of claim 13, wherein the partition member connects the cavity and the noise reduction panel, and is provided to separate the noise reduction panel from the cavity.

15. The soundproofing transformer of claim 14, wherein the partition member is disposed on outside of an outer peripheral surface of the second inlet, the noise inlet hole and the noise inlet member to form the acoustic absorption portion on an outer peripheral surface of the noise inlet member.

16. The soundproofing transformer of claim 15, wherein the acoustic absorption portion is provided with a porous acoustic absorption material.

17. The soundproofing transformer of claim 15, wherein a plurality of noise inlet members are provided, the noise inlet members being provided to be spaced apart from each other by a predetermined distance.

18. The soundproofing transformer of claim 12, wherein the resonance space of the cavity has a cylindrical form, a volume (Vo) of the resonance space of the cavity, a length ($L_{eq}$) of the noise inlet member, and a cross-sectional area (A) of the inner diameter of the noise inlet member are determined by a resonance frequency ($f_H$), the resonance frequency (fH) is determined by $$f_H = \frac{v}{2\pi}\sqrt{\frac{A}{V_o L_{eq}}}, \text{ and } v = \sqrt{\gamma\frac{P_o}{\rho}},$$

wherein γ is an adiabatic index, $P_o$ is pressure in the resonance space of the cavity, and ρ is a mass density of a fluid present in the resonance space of the cavity.

19. The soundproofing transformer of claim 17, wherein the cavity comprises:

a first cavity having a first resonance space, and to which the noise inlet member is connected; and a second cavity having a second resonance space, separated from the first resonance space and to which the noise inlet member is connected, and stacked on the first cavity, and the noise inlet member connected to the first cavity is connected to the noise reduction panel through the second resonance space and the acoustic absorption portion.

20. The soundproofing transformer of claim 17, wherein the cavity comprises:

a first cavity having a first resonance space, and to which the noise inlet member is connected; and a second cavity having a second resonance space separated from the first resonance space, the second cavity being accommodated in the first resonance space, and the noise inlet member connected to the second cavity is connected to the noise reduction panel through the acoustic absorption portion.

21. The soundproofing transformer of claim 12, wherein the cavity comprises:

a first cavity having a first resonance space, and to which a first noise inlet member communicating with the first resonance space is connected; and a second cavity having a second resonance space separated or not separated from the first resonance space, and to which a second noise inlet member communicating with the second resonance space is connected.

22. The soundproofing transformer of claim 21, wherein the first cavity and the second cavity have a connection hole on a surface facing to each other, respectively, and further comprise a cover member provided to be coupled or uncoupled to the connection hole to open or close the connection hole.

* * * * *